US006981255B2

(12) United States Patent
Kanamori

(10) Patent No.: US 6,981,255 B2
(45) Date of Patent: Dec. 27, 2005

(54) METHOD AND SYSTEM FOR ACCESSING OBJECTS OF DIFFERENT THREAD TYPES

(75) Inventor: Atsushi Kanamori, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 10/032,774

(22) Filed: Dec. 26, 2001

(65) Prior Publication Data

US 2002/0059358 A1 May 16, 2002

Related U.S. Application Data

(62) Division of application No. 08/856,136, filed on May 14, 1997.

(51) Int. Cl.[7] .................................................. G06F 9/46

(52) U.S. Cl. ...................... 718/100; 719/315; 719/316; 719/320

(58) Field of Search ............................ 718/1, 100–104, 718/108; 719/315–317, 328

(56) References Cited

U.S. PATENT DOCUMENTS

| | | | | |
|---|---|---|---|---|
| 4,525,780 A | | 6/1985 | Bratt et al. | |
| 5,475,845 A | | 12/1995 | Orton et al. | |
| 5,481,706 A | | 1/1996 | Peek | |
| 5,511,197 A | | 4/1996 | Hill et al. | |
| 5,519,867 A | * | 5/1996 | Moeller et al. | 718/107 |
| 5,951,653 A | | 9/1999 | Hill et al. | |
| 6,085,030 A | * | 7/2000 | Whitehead et al. | 709/203 |
| 6,415,334 B1 | * | 7/2002 | Kanamori | 719/316 |

OTHER PUBLICATIONS

Platt, David. "Give ActiveX-based Web Pages a Boost with the Apartment Threading Model" Microsoft Systems Journal, vol. 12 Issue 2 (Feb. 1997).*

"Using Java and COM Together: Apartment Model and Threading Issues" Microsoft Corp. (1996).*

Bottom, David, *Interfacing Ada 95 to Microsoft COM and DCOM Technologies*, ACM pp. 9-14, 1999.

Hailpern, Brent, *Extending Objects to Support Multiple Interfaces and Access Control*, pp. 1247-1257, IEEE, 1990.

Lindholm and Yellin, *The Java Virtual Machine Specification*, Sun Microsystems, Inc., Mountain View, California, pp. vii-xi and Chapters 1-3, 1997.

(Continued)

*Primary Examiner*—Meng-Al T. An
*Assistant Examiner*—Syed J Ali
(74) *Attorney, Agent, or Firm*—Klarquist Sparkman, LLP

(57) ABSTRACT

A method in a computer system for accessing Microsoft Component Object Model ("COM") objects of varying thread types from a Java-based program. The computer system has a Java virtual machine ("VM") that executes statements of the Java program and that executes in a multithreaded process. When executing a statement of the Java-based program to instantiate a COM object, the system creates a wrapper object. When the COM object is not thread-safe, the system requests an appropriate thread to instantiate the COM object and stores an identifier of the thread in the wrapper object. When the COM object is thread-safe, the system instantiates the COM object from the current thread and stores an indication in the wrapper object that the COM object can be accessed from any thread. When executing a statement of the Java-based program to invoke a method of the COM object, the system requests the thread identified in the wrapper object to invoke the method of the COM object. When the wrapper object indicates that the COM object can be referenced from any thread, the system invokes the method of the COM object referenced by the wrapper object directly from the current thread.

10 Claims, 8 Drawing Sheets

OTHER PUBLICATIONS

Rogerson, Dale E., *Inside COM*, Microsoft Press, Redmond, Washington, pp. v-xiii and Chapter 12, 1997.

Agesen et al., "Adding Type Parameterization to the Java Language," ACM SIGPLAN notices, Proceedings of the 12$^{th}$ ACM SIGPLAN Conference on Object-Oriented Programming Language and Application, Oct. 1997, pp. 49-65.

Nittel et al., "Mapping a Common Geoscientific Object Model to Heterogeneous Spacial Data Repositories," Proceedings of the 4$^{th}$ ACM International Workshop on Advanced in Geographic Informat, Nov. 1996, pp. 50-57.

Schoeder et al., "The Design and Implementation of an Object-Oriented Toolkit for 3D and Visualization," Proceedings of the 7$^{th}$ Conference on Visualization '96, Oct. 1996, pp. 93-100.

Seiter et al., "Evaluation of Object Behavior Using Context Relations," ACM SIGPLAN Software Engineering Notes, Proceedings of the 4$^{th}$ ACM SIGPLAN Symposium on Foundations of Software Engineering, Oct. 1996, pp. 46-57.

* cited by examiner

```
class      IEapp
{   public static void main()
        { :
            pIEObject= new IEObject;
           WebBr wb= (WebBr)pIEObject;
                       i = wb. Navigate (URL);
              :
        }
}
```

FIG. 4

```
IEObject. class
        CLSID = IEObject
        IID_WebBr
             COM
                  Navigate (bstr);
                         :
              JAVA
                  Navigate (jlstring);
                     :
         IID_DataObject
```

FIG. 5

METHOD AND SYSTEM FOR ACCESSING OBJECTS OF DIFFERENT THREAD TYPES

CROSS REFERENCE TO RELATED APPLICATIONS

This is a divisonal of U.S. patent application Ser. No. 08/856,136, filed May 14, 1997.

TECHNICAL FIELD

The present invention relates generally to accessing objects in a computer system and more particularly to accessing objects of different thread types.

BACKGROUND OF THE INVENTION

Most computer systems execute under the control of a multiprocessing operating system. A multiprocessing operating system is designed to control the concurrent execution of multiple computer programs. Such operating systems typically allow one program to execute for a while, and then allow another computer program to execute. Before each computer program is allowed to execute, the operating system initializes the system resources (e.g., CPU registers) to their state when that computer program last executed and, if necessary, loads the computer program back into memory. Thus, when the computer program is allowed to execute again, its execution continues where it left off. Each executing computer program is generally referred to as a "process," and the state of the computer system when that computer program executes is referred to as the "context" of the process.

Computer programs that are executing concurrently may have the need to communicate with each other. A computer application may be implemented as multiple cooperating computer programs that each execute as separate processes. One computer program may request another computer program to perform a certain function on its behalf. Each time the operating system allows a different computer program to execute, the operating system performs what is referred to as a process context switch. The context switch involves saving the current state of the executing process so that it can continue execution at a later time, and restoring the previous state of the computer program to be executed. The saving and restoring of the contexts may place an unacceptable overhead on the computer system. To avoid the overhead of process context switching, some operating systems have implemented the concept of a lightweight process or a thread. Within a single process, the operating system may allow several threads to execute concurrently. Each thread in a process shares the same address space (i.e., code and data), but each thread has its own program counter and other register values. The operating system allows each thread in the process to execute for a while and then switches control to the next thread. Because the threads share the same address space, the context switching from one thread to another can be accomplished much faster than switching from one process to another. Thus, the concept of multithreading allows many of the advantages of multiprocessing, but without the overhead of process context switches.

Many server computer programs (i.e., servers) that provide services to multiple client computer programs (i.e., clients) are implemented using multiple threads. When a client requests the server to perform a service on behalf of the client, the server will create a thread to provide that service for the client. Thus, when multiple clients request services at approximately the same time, the server will be executing many threads. The data that a process accesses is often organized into objects that encapsulate data and code for accessing that data. Because the threads within a process share the same data, access control to the data must be coordinated by the threads. With such a multithreading server, the developer of the server is responsible for coordinating access to the objects so that the processing by one thread will not be interfered with by another thread. For example, the developer may need to ensure that appropriate synchronization mechanism (e.g., locks and semaphores) are defined for each object. A synchronization problem could occur when two threads attempt to access an object concurrently. For example, if both threads A and B need to modify the same object, then a synchronization problem could occur in the following way. When the object provides a method to increment a data member, the method may load the value of the data member into a register, increment the value, and store the value back into the data member. However, if thread A invokes the method, the current value (e.g., 10) of the data member may get loaded into a register and then a thread context switch may occur so that thread B executes. If thread B also invokes the method, the current value (e.g., 10) of the data member would be loaded into a register, incremented (e.g., 11), and stored back into the data member. When thread A again executes, it resumes execution of the method. In this case, the value (i.e., 10) in its register is incremented (e.g., 11) and stored back into the data member. Thus, after execution of the method by both threads the data member will have a value of 11 rather than the expected value of 12. It may take a considerable amount of programming to develop a computer program that avoids various synchronization problems. The synchronization problems also occur when multiple processes, even with only one thread each, access shared memory. Thus, in general the problems occur when any threads, regardless of whether they are in the same or different processes, access objects in shared memory.

To help simplify development of such objects, an apartment model has been developed. According to the apartment model, each object can only be accessed by the single thread. Because each object can only be accessed by a single thread no synchronization problems occur as a result of multiple threads accessing the object concurrently. That is, the single thread can serially process each request to access the object. Thus, when a thread wants to access an object, it requests that the thread for the object perform the function on behalf of the requesting thread. The group of objects that can be accessed by a thread is referred to as an apartment. The apartment model is described in U.S. patent Ser. No. 08/381,635, entitled "Method and System for Multithreaded Processing," which is hereby incorporated by reference. A preferred technique for sending the request from one thread to another is referred to as marshaling and described in U.S. Pat. Ser. No. 5,511,197, entitled "Method and System for Network Marshalling of Interface Pointers for Remote Procedure Calls," which is hereby incorporated by reference.

When a programmer is developing a new object, the programmer needs to make a decision as to whether the object will be accessed only by a single thread or by multiple threads. If the object is to be accessed only by a single thread (i.e., an apartment-threaded object), then the implementation of the object is fairly straightforward because synchronization problems can be avoided by serializing access. Conversely, if the object is to be accessed by multiple threads in a multithreaded apartment (i.e., a free-threaded object), then the appropriate synchronization management mechanisms need to be developed. Unfortunately, apartment-threaded objects cannot be accessed by a client developed to access objects from any thread. When free-threaded objects are being used, a client is developed to simply pass pointers to the objects from one thread to another thread. The receiving thread would access the object directly, regardless of which thread created the object. Thus, if such a client loaded an apartment-threaded object, synchronization problems may occur as multiple threads accessed the object concurrently. Consequently, each class of object has an associated thread type. The thread type of the class can be either apartment-threaded or free-threaded. Two other thread types can be defined: single-threaded objects and both-threaded objects. A single-threaded object (referred to as a main-threaded object in the following) is an apartment-threaded object that can only be loaded into the apartment for the main thread of the process. A both-threaded object is compatible with both the apartment model and the free-threading model and thus can be loaded by a process that uses either model.

Many objects have been developed, in accordance with the Microsoft Component Object Model ("COM"), that are apartment-threaded, free-threaded, main-threaded, or both-threaded. COM is described in "Inside OLE, Second Edition," by Kraig Brockschmidt and published by Microsoft Press, which is hereby incorporated by reference. It would be desirable if these objects could be accessed by programs that were not developed to adhere to COM. For example, programs written in the Java programming language typically do not adhere to COM. However, it would be desirable if Java programs could access COM objects of varying thread types in a manner that is transparent to the Java program. Such accessibility would be especially useful in Web pages developed for the World-Wide Web. Such Web pages often contain Java applets that are executed by the Java virtual machine ("VM") when the Web page is presented (typically by a Web browser). A Java VM provides a multithreaded execution environment for the Java programming language. These Java applets could take advantage of the functionality of the COM objects that have already been developed. However, a programmer of the Java applet would currently need to develop the applet so that it adheres to the COM. It would be desirable to have a mechanism in which a Java applet could access COM objects without having to be concerned of the COM threading model.

SUMMARY OF THE INVENTION

The present invention provides a method and system for accessing object of varying thread types in a manner that is transparent to the computer program accessing the objects. The thread types of the objects are categorized as thread-safe and not thread-safe. The free-threaded and both-threaded objects are thread-safe, and the apartment-threaded and main-threaded objects are not thread-safe. The thread system of the present invention creates a thread, designated as the apartment thread, for receiving message to instantiate objects and to invoke methods of the instantiated objects. When the program designates to instantiate an object, the thread system determines the thread type of the object. When the thread type is not thread-safe, the thread system sends a message to the appropriate thread (i.e., apartment or main thread) to instantiate the object. When the thread type is thread-safe, the thread system instantiates the object within the currently executing thread. When the program designates to invoke a method of the instantiated object, if the object is not thread-safe, then the thread system sends a message to the appropriate thread to invoke the method of the instantiated object. If the object is thread-safe, then the thread system invokes the method of the instantiated object directly from the current thread.

In another aspect of the present invention, the thread system determines whether a object can be accessed from the current thread without knowing the class or thread type of the object. When the thread system is returned a pointer to an object from a returning thread, the thread system then requests the returning thread to marshal another pointer to the object. If the marshaled pointer has the same value as the returned pointer, then the object can be access directly from the current thread. If, however, the pointers are not the same, then the marshaled pointer points to a proxy object and the object needs to be accessed by the returning thread. In this way, the thread system can determine when a returned object can be access from the current thread and thus avoid the overhead of requesting the returning thread to access the object.

BRIEF DESCRIPTION OF THE DRAWINGS

FIG. 4 illustrates an example portion of a Java application program.

FIG. 5 is a diagram illustrating the layout of a class definition file for the IEObject object.

DETAILED DESCRIPTION OF THE INVENTION

Figure 1:
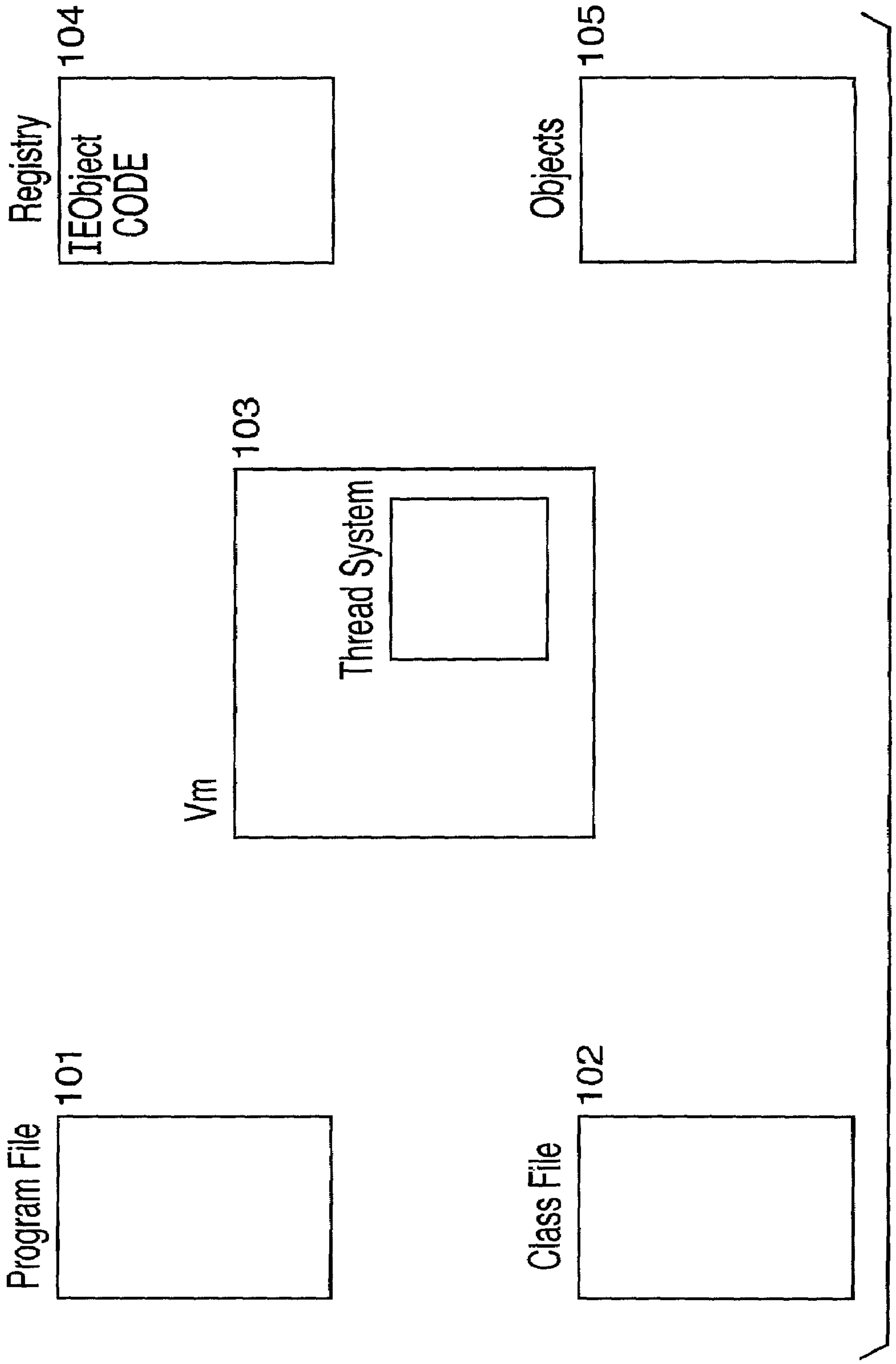
FIG. 1 is a block diagram illustrating the components of the thread system in a Java programming language environment.

The present invention provides a method and system for accessing objects of varying thread types from a program that does not support objects of varying thread types. In accordance with a preferred embodiment, the thread system of the present invention intercepts each attempt by the program to access an object developed to support different threading models. When the thread system intercepts an attempt to instantiate such an object, the thread system first determines the thread type of the object. If the thread type is free-threaded or both-threaded (i.e., thread-safe), then the thread system instantiates the object in the current thread, since thread-safe objects are accessible in any thread. If the thread type is main-threaded or apartment-threaded (i.e., not thread-safe), then the thread system requests that the appropriate thread (i.e., main thread or apartment thread) instantiate the object. The thread system also creates an apartment thread for accessing apartment-threaded objects. The thread system also keeps track of the thread that instantiated each object that is not thread-safe. However, the thread system does not need to keep track of the thread that instantiated objects that are thread-safe since they can be accessed from any thread. When a method (i.e., member function) of an object that is not thread-safe is invoked, the thread system requests that the thread that instantiated the object to invoke the method. However, the thread system can invoke the method from the current thread when the object is thread-safe. In this way, the thread system ensures that each object that is developed to support the threading model is accessed from the appropriate thread by a program that is not developed to support the threading model for objects.

In another aspect of the invention, the thread system ensures that objects which are returned by a method of an object that supports the threading model are accessed from the correct thread. When such an object is returned (i.e., a pointer to the object is returned), the thread system tracks the thread that invoked the method that returned the object (i.e., the returning thread). Whenever a method of that returned object is subsequently invoked, the thread system requests the returning thread to invoke that method. Although such tracking and requesting of returning threads allows for proper access of objects of all thread types, it is unnecessary for thread-safe objects since they can be accessed from any thread. Unfortunately, the thread system typically cannot identify whether such returned objects are free-threaded or both-threaded because it does not have access to the class identifier of the returned objects. Nevertheless, the thread system can determine whether the returned objects are thread-safe. In particular, the thread system requests that the returning thread marshal a pointer to the returned object to the current thread. As will be explained below in more detail, if the marshaled pointer has the same value as the pointer to the returned object, then the pointer to the returned object points directly to the returned object and the methods of that returned object can be invoked directly from the current thread (and any other thread). Thus, the thread system does not need to request the returning thread to access the returned object. If, however, the pointers are not the same, then the thread system still needs to request the returning thread to access the returned object.

FIG. 1 is a block diagram illustrating the components of the thread system in a Java programming language environment. The thread system is implemented as part of the Java virtual machine ("VM"). The Java VM provides a Java-based environment for executing programs written in the Java programming language. The Java VM reads Java statements (actually instructions represented by bytecodes) from a Java program file 101 and performs the functionality associated with each statement. A Java program may be written to access objects that were developed for a different operating environment. In particular, a Java program may access objects developed in accordance with the Microsoft Component Object Model ("COM"). Because the object model for the Java programming language is different from COM, the thread system performs a mapping from the Java object model to COM. When a COM object is to be used by a Java program, a class definition file 102 is created. The class definition file contains information that identifies that the object is a COM object and contains information for mapping the interfaces supported by the COM object to the Java model. An interface is a collection of methods supported by an object. When a Java program attempts to create a COM object, the thread system of Java VM detects that such an object is being accessed based on the information in the class definition file. In particular, the class definition file contains the class identifier of the COM object. The class identifier uniquely identifies the class of the COM object. The thread system uses the class identifier to access a registry 104 to determine the thread type for objects of the identified class. If the thread type of a COM object is free-threaded or both-threaded, then the object is thread-safe and the Java VM can invoke the COM object from whatever thread it is currently executing. However, if the COM object is apartment-threaded or main-threaded, then the object is not thread-safe and the Java VM can only access the object from the appropriate thread. The thread system executes on a computer system that includes a memory, central processing unit, and secondary storage. The thread system is typically permanently stored on a computer-readable medium, such as a CD-ROM. The instructions that comprise the thread system are loaded from the computer-readable medium into memory and executed by the central processing unit.

Figure 2:
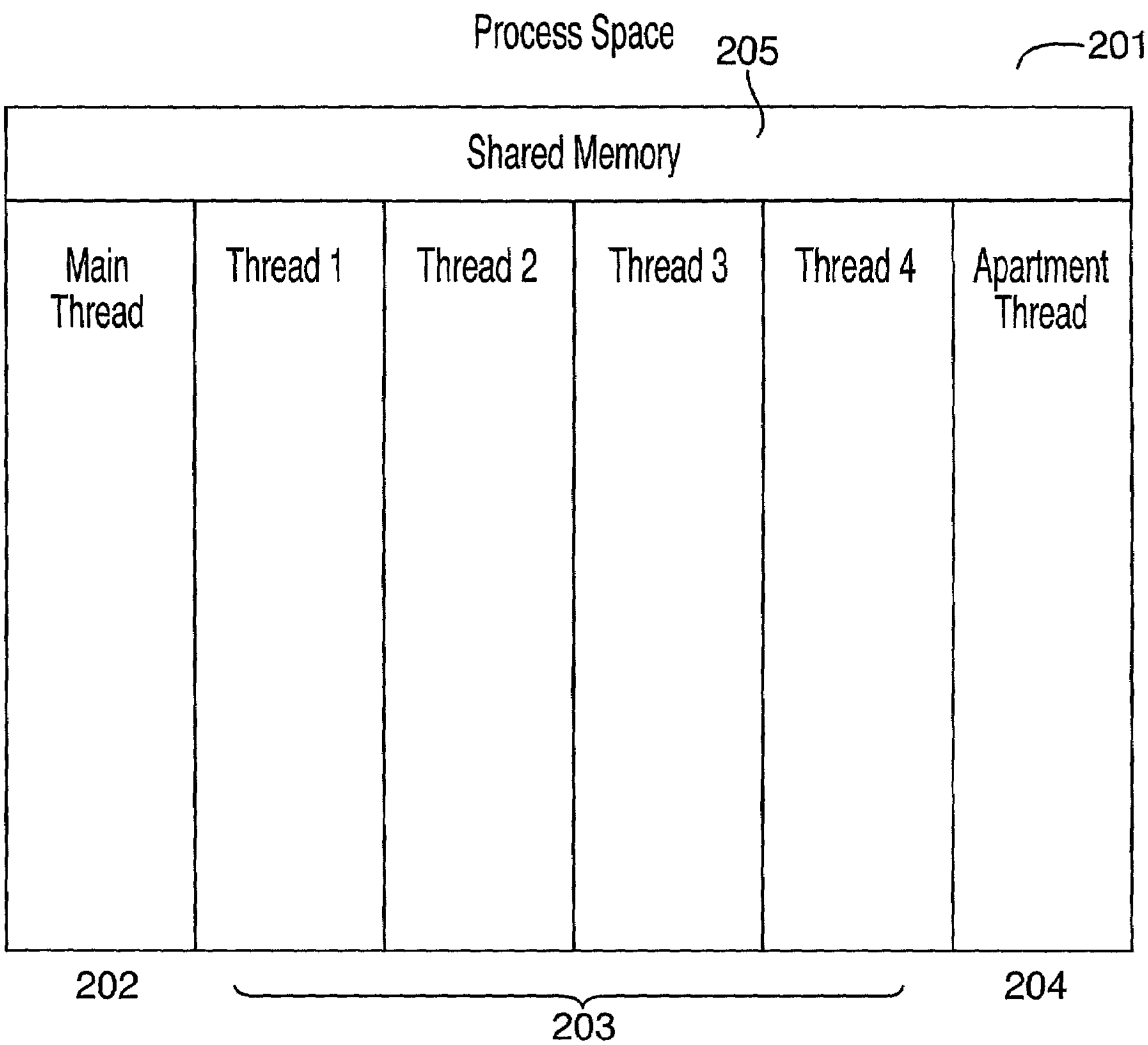
FIG. 2 is a block diagram illustrating the threads of the process space in which the Java VM is executing.

FIG. 2 is a block diagram illustrating the threads of the process space in which the Java VM is executing. The Java VM can have multiple threads within its process space 201 as specified by the Java program. Each Java VM process has a main thread 202 plus additional threads 203 that are created at the request of the Java program. In addition, the Java VM process has a thread designated as the apartment thread 204. The apartment thread is preferably created during initialization of the Java VM. Alternatively, the creation of the apartment thread can be deferred until the Java program first attempts to access a COM object that is apartment-threaded. When the Java program attempts to instantiate an object that is not thread-safe, the Java VM requests that the appropriate thread instantiate the object. Thereafter, whenever the Java program attempts to invoke a method of the not thread-safe object, the Java VM detects such an attempt and requests that such invocation be under control of the appropriate thread. If, however, the COM object is thread-safe, then the Java VM can access the object regardless of the thread in which it currently happens to be executing.

When the Java program instantiates an object, the Java VM allocates memory for the object that is identified by a reference (i.e., pointer) to the allocated memory. The Java program can then access the object using the reference. However, the thread system needs to intercept accesses to COM objects to ensure that the correct thread handles the request. Consequently, the Java VM provides the Java program with a reference to a wrapper object, rather than a reference to the COM object. The wrapper object contains an indication of the "home" thread for the COM object. The home thread identifies the thread through which thread the COM object should be accessed. When a Java program attempts to access a COM object using a reference to the wrapper object, the thread system gains control and ensures that the request to access is handled by the home thread.

Figure 3:
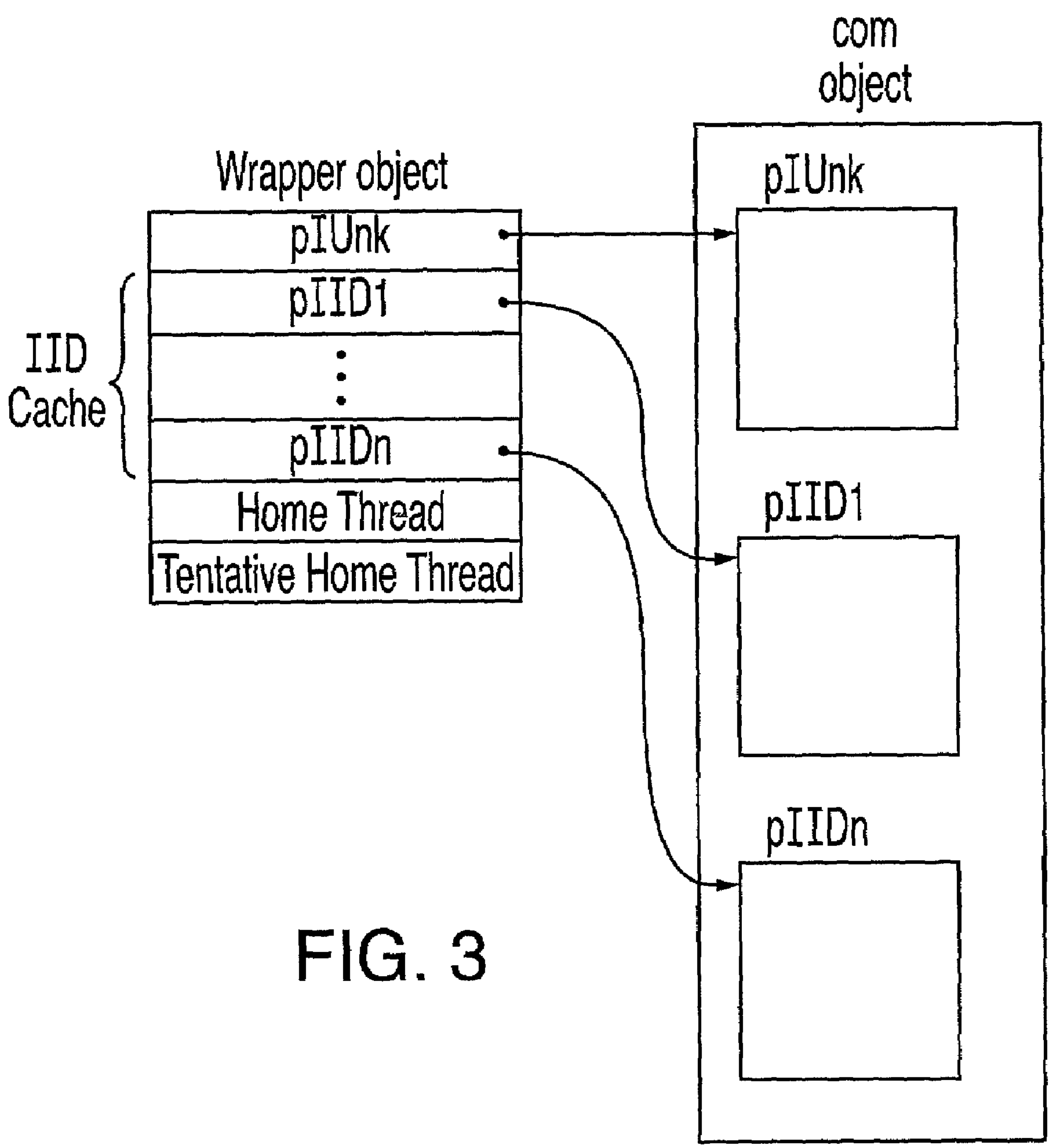
FIG. 3 is a block diagram of a wrapper object that is used to map a Java reference to the underlying COM object.

FIG. 3 is a block diagram of a wrapper object that is used to map a Java reference to the underlying COM object. The wrapper object contains a pointer to the IUnknown interface of the COM object and contains the thread identifier of the home thread of the COM object. The wrapper object also contains a cache of pointers to various interfaces supported by the COM object. If the home thread field is null, then the object is thread-safe and can be accessed from any thread. The wrapper object also contains a flag that indicates whether the home thread is tentative. If the flag indicates that the home thread is tentative, then the thread system has not yet determined whether or not an object returned by a COM object is thread-safe.

FIG. 4 illustrates an example portion of a Java application program. This Java program instantiates an object of a class type IEObject. The program then requests that the object be cast to the type WebBr, which identifies the IWebBr interface supported by the class IEObject. The Java program then invokes the Navigate method of the IWebBr interface passing the universal resource locator ("URL") of the resource to be accessed.

FIG. 5 is a diagram illustrating the layout of a class definition file for the IEObject object. The class definition file contains the class identifier of the IEObject class. The file also contains the identification of each interface supported by the IEObject class (e.g., IID_WebBr). The definition also contains the prototype for each method of the interface in accordance with COM and the prototype of each method of the interface in accordance with the Java model.

Figure 6:
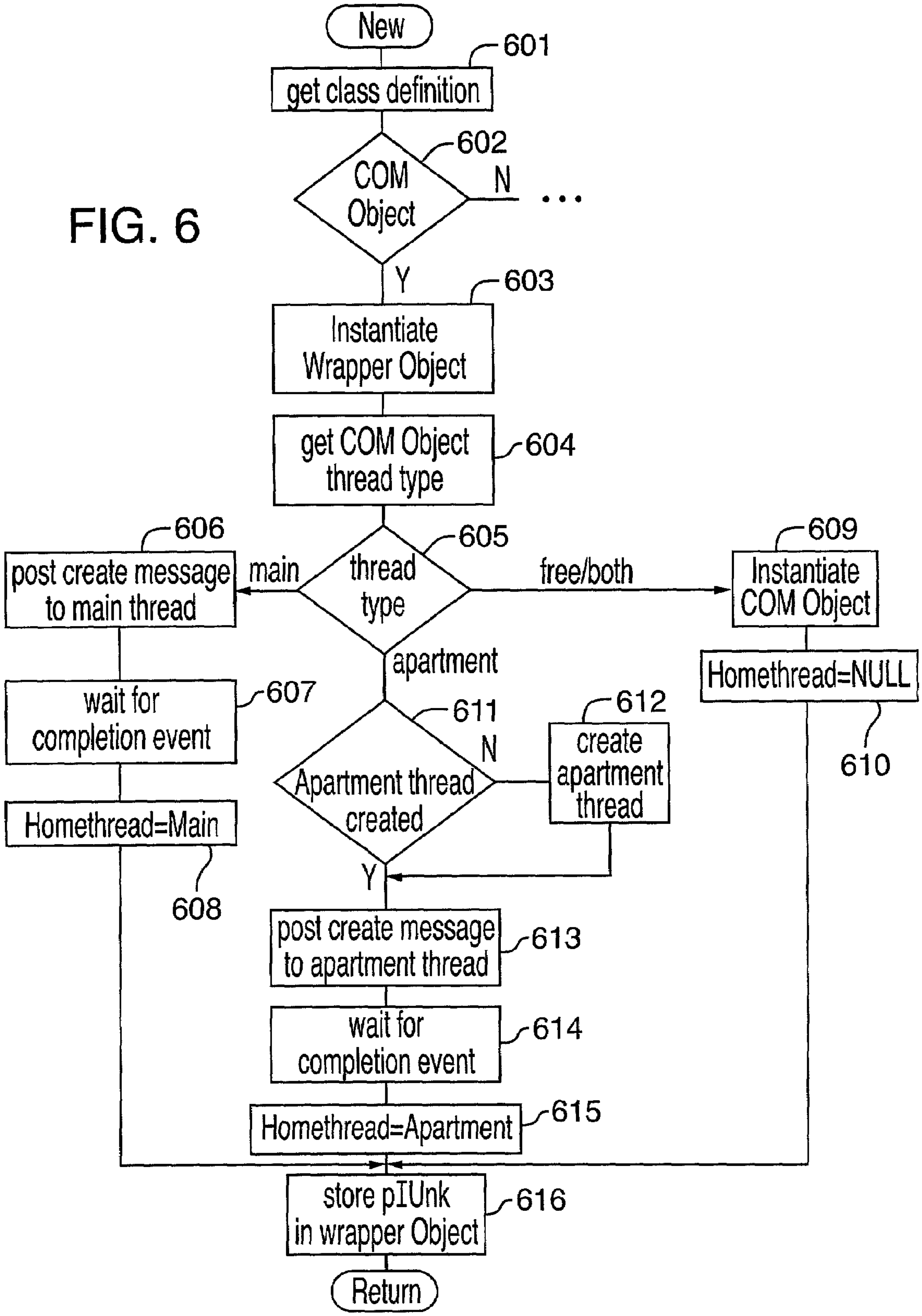
FIG. 6 is a flow diagram illustrating the processing of the Java VM for the "new" statement.

The Java VM operates by retrieving statements from the Java program and performing the processing specified by the bytecodes. FIG. 6 is a flow diagram illustrating the processing of the Java VM for the "new" statement. The Java VM determines whether the object to be instantiated is a COM object. In step 601, the Java VM retrieves the class definition for the object to be instantiated from the class definition file. In step 602, if the class definition indicates that the object is a COM object, then the Java VM continues at step 603, else the Java VM continues its processing for Java objects. In step 603, the Java VM instantiates a wrapper object for the COM object. In step 604, the routine retrieves the thread type of the COM object from the registry. In step 605, if the thread type is main-threaded, then the Java VM continues at step 606. If the thread type is free-threaded or both-threaded, then the Java VM continues at step 609. If the thread type is apartment-threaded, then the Java VM continues at step 611. In steps 606–608, the Java VM processes COM objects that are the main-threaded. In step 606, the Java VM posts an instantiate object message to the main thread of the Java VM. In step 607, the current thread waits for an indication that the instantiation of the COM object has been completed by the main thread. The home threads communicate completion of an access to a COM object by setting an event for which the current thread waits. In step 608, the Java VM sets the home thread field of the wrapper object to the thread identifier of the main thread. In steps 609–610, the Java VM processes COM objects that are either free-threaded or both-threaded. In step 609, the Java VM instantiates the COM object in the current thread. In step 610, the Java VM sets the home thread field of the wrapper object to null. The null setting indicates that the COM object can be accessed from any thread. In steps 611–615, the Java VM processes COM objects that are apartment-threaded. In step 611, if the Java VM has already created an apartment thread, then the Java VM continues at step 613, else the Java VM continues at step 612. In step 612, the Java VM creates an apartment thread within the process for the Java VM. In step 613, the Java VM posts an instantiate object message to the apartment thread. In step 614, the Java VM waits for completion of the instantiation of the COM object by the apartment thread. In step 615, the Java VM sets the home thread field of the wrapper object to the thread identifier of the apartment thread. In step 616, the Java VM, regardless of the thread type of the COM object, stores a pointer to the IUnknown interface of the COM object in the wrapper object and then returns. The Java VM also sets the tentative home thread flag to indicate that the home thread is not tentative. Since the Java VM accessed the registry, it determined the thread type and thus the home thread is not tentative.

Figure 7:
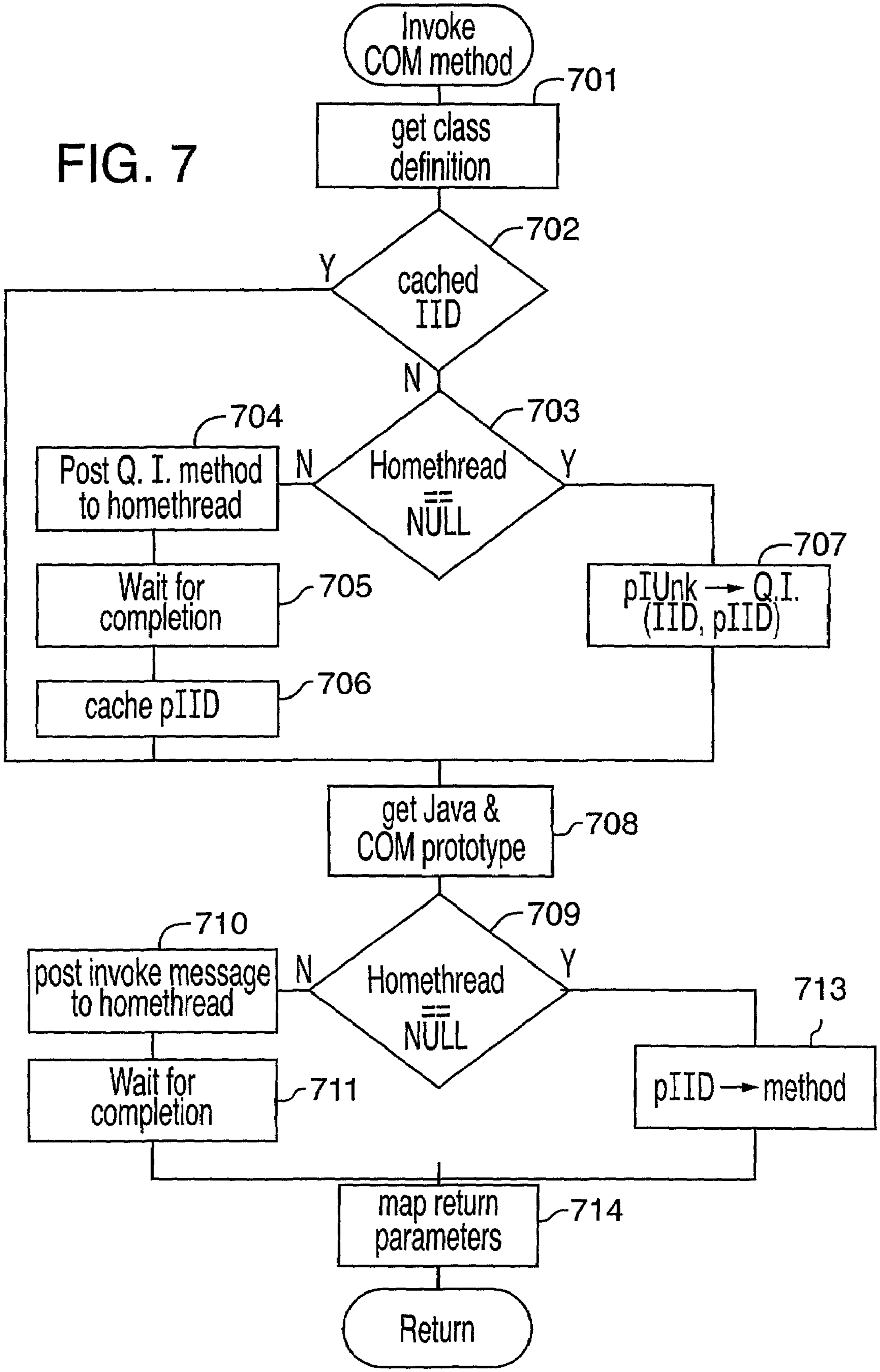
FIG. 7 is a flow diagram illustrating the processing of the Java VM for a statement that invokes a method of a COM object.

FIG. 7 is a flow diagram illustrating the processing of the Java VM for a statement that invokes a method of a COM object. When the Java VM detects that the Java program is accessing a COM object, the Java VM identifies which interface is being invoked and requests a pointer to that interface from the COM object using query interface. The Java VM then requests the home thread to invoke the method of that interface. In step 701, the Java VM retrieves the class definition of the COM object from the class definition file. In step 702, if the pointer to the interface that includes the method has already been cached in the wrapper object, then the Java VM continues at step 708, else the Java VM continues at step 703. In step 703, if the home thread field of the wrapper object indicates a null, then the Java VM continues at step 707, else the Java VM continues at step 704. In step 704, the Java VM posts an invoke message to the home thread identified in the wrapper object to invoke the query interface method and retrieve a reference to the interface. In step 705, the Java VM waits for an indication that the home thread has completed. In step 706, the Java VM caches a pointer to the interface in the wrapper object then continues at step 708. In step 707, the Java VM invokes the query interface method of the IUnknown interface from the current thread to retrieve the pointer to the interface. In step 708, the Java VM retrieves the Java and COM prototypes from the class definition file. In step 709, if the home thread field in the wrapper object is null, then the Java VM continues at step 713, else the Java VM continues at step 710. In step 710, the Java VM posts an invoke message to invoke the designated method of the interface to the home thread. In step 711, the Java VM waits for completion of the invocation of the method by the home thread. In step 713, the Java VM invokes the designated method from the current thread in accordance with the Java and COM prototypes. The Java VM stores the parameters to be passed in a manner that COM objects expect. In step 714, the Java VM maps return parameters and returns.

As described above, the thread system handles the situation when a COM object returns a reference to another COM object. In such a case, the Java program does not explicitly instantiate the COM object to be returned. Rather, the COM object to be returned is instantiated and returned as a parameter of a method of another COM object. In one embodiment, the thread system keeps track of which thread returned the COM object (i.e., the returning thread). The COM object is returned by returning a pointer to the IUnknown interface of the COM object. When a COM object is returned, the thread system instantiates a wrapper object. The thread system then stores the thread identifier of the returning thread in the home thread field of the wrapper object for the returned object. Whenever a method of the returned COM object is invoked, the thread system intercepts the invocation and requests the home thread to access the COM object. Such an approach of always requesting the home thread is a conservative approach. In particular, if the returned object happens to be thread-safe, then there would be no need to request the home thread to invoke the method. Rather, the thread system could simply invoke the method from the current thread. However, the thread system may not be able to determine the thread type of the returned COM object. In particular, the thread system may not know the class identifier of the COM object and thus cannot retrieve the thread type from the registry. In another embodiment, the thread system makes use of a feature called free-threaded marshaling to identify if the COM object is thread-safe.

According to the concept of free-threaded marshaling, when a thread-safe object is requested to be marshaled to another thread within the same process, a pointer directly to that object can be returned, rather than using the standard marshaling technique. The standard marshaling technique uses a proxy object and a stub object. Each time an object is marshaled using standard marshaling a new proxy object is instantiated. Thus, marshaled pointers to the same COM object will have different values, since they point to different proxy objects. However, pointers to the same COM object that are marshaled using free-threaded marshaling will have the same value, since they point to the COM object itself and not to a proxy object. When the thread system attempts to first invoke a method of a returned COM object, the thread system requests the returning thread to marshal a pointer to the COM object to the current thread. The returning thread marshals the pointer according to the marshaling technique of the COM object. When the thread system receives the marshaled pointer, the thread system compares that pointer to the pointer to the IUnknown interface for that returned COM object stored in the wrapper object. If both pointers to the IUnknown interface are the same, then the COM object is thread-safe and the thread system can directly invoke the methods of the COM object from any thread. However, if the pointers are not the same, then standard marshaling created a new proxy object to which the marshaled pointer points and thus the COM object is not thread-safe. When the COM object is not thread-safe, the thread system requests the returning thread identified in the home thread field to access the COM object.

Figure 8:
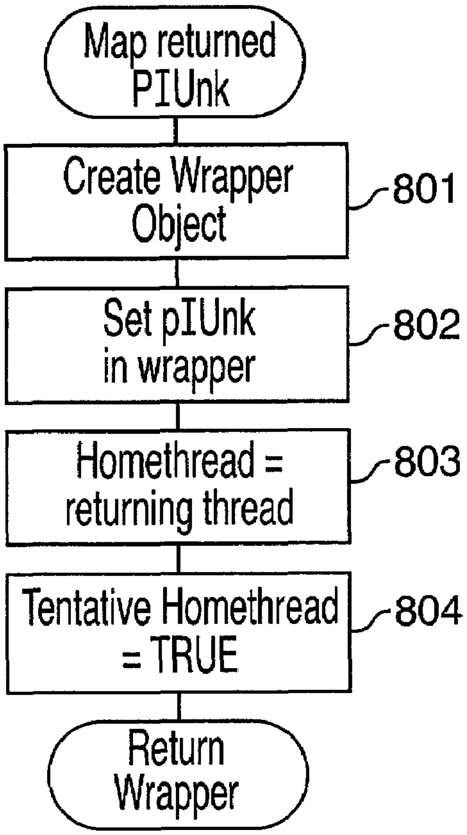
FIG. 8 is a flow diagram illustrating processing of the Java VM when a pointer to a COM object is returned by a COM object.

FIG. 8 is a flow diagram illustrating processing of the Java VM when a pointer to a COM object is returned by a COM object. This processing is performed as part of step 714 of mapping the return parameters when a method of a COM object is invoked. In step 801, the Java VM instantiates a wrapper object for the returned COM object. In step 802, the Java VM sets the pointer to the IUnknown interface of the wrapper object to the returned pointer. In step 803, the Java VM sets the home thread field of the wrapper object to the thread identifier of the returning thread. In step 804, the Java VM sets the tentative home thread flag of the wrapper object to tentative. The Java VM then returns.

Figure 9:
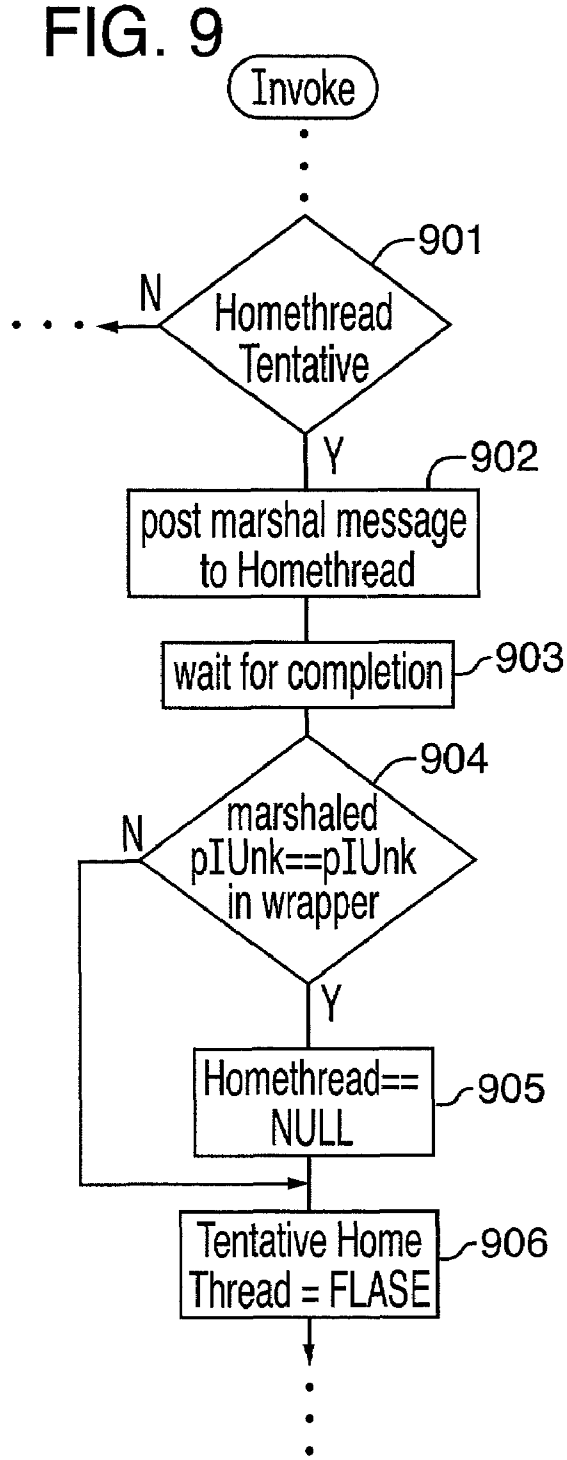
FIG. 9 is a flow diagram illustrating processing of the Java VM when invoking a method of a COM object whose home thread is marked as tentative.

FIG. 9 is a flow diagram illustrating processing of the Java VM when invoking a method of a COM object whose home thread is marked as tentative. The process of this flow diagram can be performed before step 701 of FIG. 7. In step 901, if the home thread is marked as tentative as indicated by the tentative home thread flag, then the Java VM continues at step 902, else the Java VM continues its normal processing. In step 902, the Java VM posts an invocation message to the home thread identified in the wrapper object requesting that a pointer to the COM object be marshaled to it. In step 903, the Java VM waits for completion of the marshaling. In step 904, if the marshaled pointer to the IUnknown interface is the same as the pointer to the IUnknown interface in the wrapper object, then the Java VM continues at step 905, else the Java VM continues at step 906. In step 905, the Java VM sets the home thread field to null because the COM object is identified as being thread-safe. In step 906, the Java VM sets the tentative home thread flag to indicate not tentative and continues with its processing.

Figure 10:
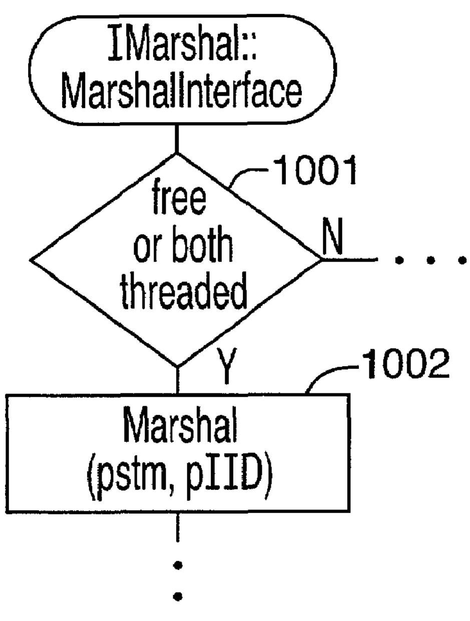
FIG. 10 is a flow diagram illustrating free-thread marshaling of a COM object.

FIG. 10 is a flow diagram illustrating free-thread marshaling of a COM object. The IMarshal interface provides a method named MarshalInterface. When free-threaded marshaling is performed, the pointer to the interface is passed directly, rather than the creation of stub and proxy objects of standard marshaling. In step 1001, if the COM object is free-threaded, then the method sends a pointer to the COM object in step 1002, rather than marshaling a reference to a stub object as in standard marshaling.

Figure 11:
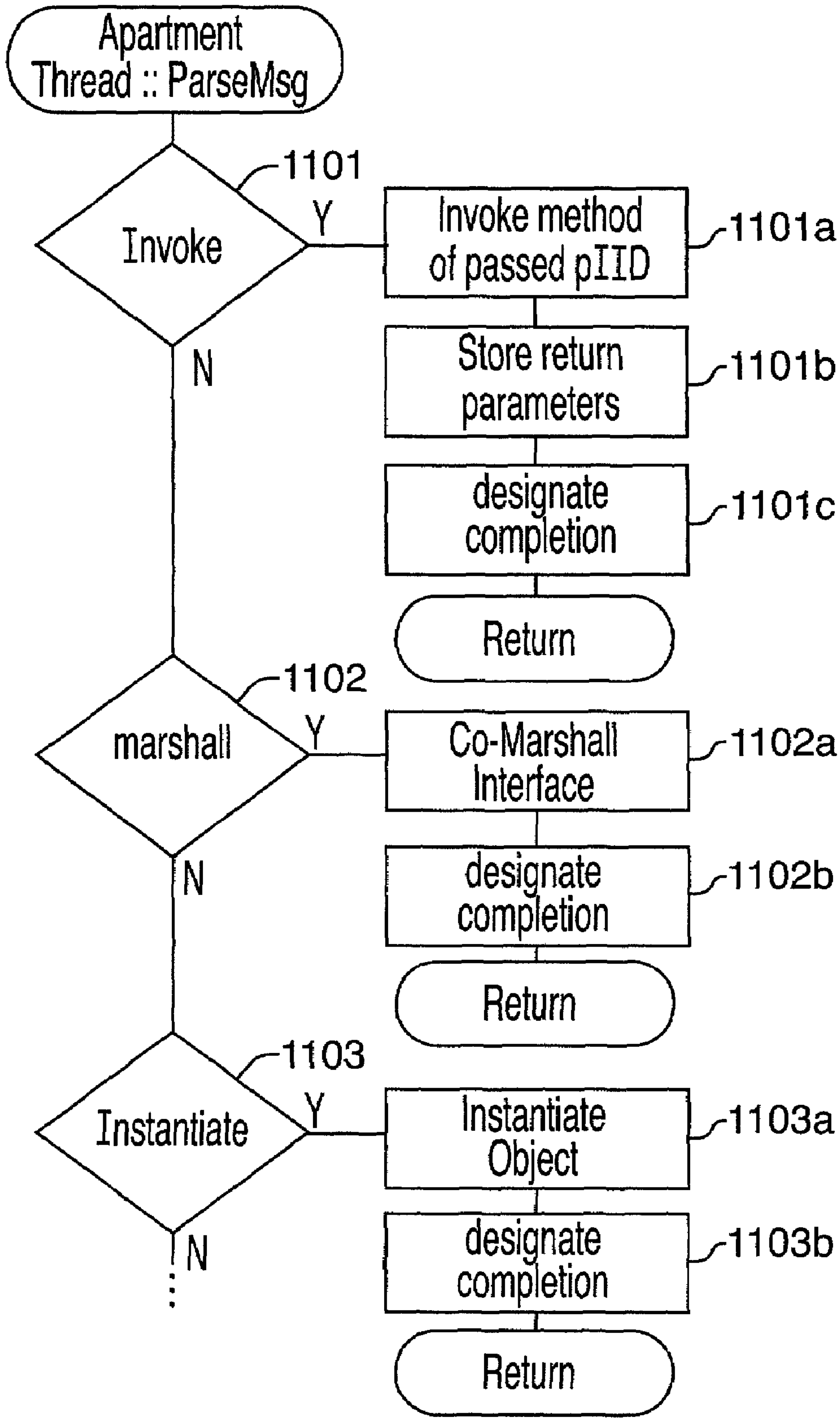
FIG. 11 is a block diagram illustrating the message loop of the apartment thread of the Java VM.

FIG. 11 is a block diagram illustrating the message loop of the apartment thread of the Java VM. When a message is received by the message loop of the apartment thread, this routine is invoked. In step 1101, if the message indicates to invoke a method of an object, then the routine continues at step 1101*a*, else the routine continues at step 1102. In step 1101*a*, the routine invokes the method of the COM object. In step 1101*b*, the method stores the return parameters. In step 1101*c*, the routine designates completion of the invocation by setting the event and returns. In step 1102, if the message indicates that a reference is to be marshaled, then the routine continues at step 1102*a*, else the routine continues at step 1103. In step 1102*a*, the routine invokes the CoMarshalInterface function to marshal an interface to the COM object. In step 1102*b*, the routine designates completion of the marshaling and returns. In step 1103, if the message indicates to instantiate an object, then the routine continues at step 1103*a*. In step 1103*a*, the routine instantiates the COM object of the class identified in the message and stores a reference to the COM object in shared memory so that the thread that sent the message can identify the COM object. In step 1103*b*, the routine designates completion of the instantiation and returns.

When the Java VM invokes methods of COM objects, it maps between Java prototypes and COM prototypes. In the Java programming language, parameters that are returned are not passed by reference. Rather, a parameter is returned as the value of the method. The following statement is a typical invocation of a method in the Java programming language.

```
out_param=object.method (in_param 1, in_param 2)
```

The value returned by the method is stored in the variable out_param. If a Java method fails, then an exception is generated. COM, however, uses a prototype standard in which out parameters are passed by reference and the value of the method represents the success of the method. Moreover, if the method is unsuccessful, no exception is generated. The following statement is a typical invocation of a method of a COM object.

```
int hr=pObject→method (in_param 1, in_param 2,
    out_param)
```

The variable hr is set to indicate the success or failure of the invocation.

A Java program could interface directly with a thread-safe COM object by effecting parameter passing by reference using arrays. Since Java passes arrays by reference, the Java program can define an array whose one element is of the type of the parameter to be passed. The following statements can be used by the Java program.

```
int[ ]i={0}

int hr=Object.method(i)

if(hr< >0)then exception
```

However, such programming techniques are generally inconsistent with principles of the Java programming language. Thus, it would be desirable to map Java prototypes to COM prototypes in a way that is transparent to a Java programmer. The technique used by the Java VM to intercept access to COM objects can also be used to map the prototypes.

When the class definition file for a COM object is created, each COM prototype indicates which out parameter should be returned as the value for the corresponding Java prototype. When the Java VM invokes a method of a COM object, it does so in accordance with the following pseudocode.

```
hr=pObject→method(in_param 1, in_param 2,
    out_param)

if(hr< >0)then exception

store out_param in EAX register

return
```

By these statements, the Java VM maps COM objects to Java objects in a way that is transparent to the Java program.

From the foregoing it will be appreciated that, although specific embodiments of the invention have been described herein for purposes of illustration, various modifications may be made without deviating from the spirit and scope of the invention. For example, if the Java VM happens to be executing in the home thread of a COM object, then the Java VM can directly access the COM object from the current thread without sending a message to the home thread. Also, although the present invention has been described in conjunction with its use in a Java VM, the present invention can be used in conjunction with other programming environments that do not adhere to the COM threading model. Accordingly, the invention is not limited except as by the appended claims.

What is claimed is:

1. A method in a computer system for determining whether a method of an object can be invoked from a current thread, the object being instantiated by an instantiating thread and being identified by a first reference accessible to the current thread, the method comprising:

the current thread requesting the instantiating thread to marshal a second reference to the object to the current thread;

when the second reference is received by the current thread, determining whether the second reference is the same as the first reference;

when the references are the same, invoking the method of the object from the current thread; and when the references are not the same, requesting that the instantiating thread invoke the method of the object.

2. The method of claim 1 including saving an indication of whether the instantiating thread should be used to invoke methods of the object so that the instantiating thread is requested to invoke the method of the object for subsequent invocations of methods of the object.

3. The method of claim 1 includiug saving an indication of whether any current thread can be used to invoke the method of the object so that any current thread can invoke methods of the object.

4. The method of claim 1 wherein the instantiating thread uses a marshaling member function of the object to marshal the second reference and wherein when the object is thread-safe, the marshaling member function marshals a pointer that points directly to the object.

5. The method of claim 1 wherein object is developed to adhere to the Microsoft Component Object Model.

6. A computer-readable medium containing instructions for causing a computer system to determine whether a method of an object can be invoked from the current thread, the object being instantiated by an instantiating thread and being identified by a first reference accessible to the current thread, by:

the current thread requesting the instantiating thread to marshal a second reference to the object to the current thread;

when the second reference is received by the current thread, determining whether the second reference is the same as the first reference;

when the references are the same, invoking the method of the object from the current thread; and when the references are not the same, requesting that the instantiatiug thread invoke the method of the object.

7. The computer-readable medium of claim 6 including saving an indication of whether the instantiating thread should be used to invoke methods of the object so that the instantiating thread is requested to invoke the method of the object for subsequent invocations of methods of the object.

8. The computer-readable medium of claim 6 including saving an indication of whether any current thread can be used to invoke the method of the object so that any current thread can invoke methods of the object.

9. The computer-readable medium of claim 6 wherein the instantiating thread uses a marshaling method of the object to marshal the second reference and wherein when the object is thread-safe, the marshaling method marshals a pointer that points directly to the object.

10. The computer-readable medium of claim 6 wherein object is developed to adhere to the Microsoft Component Object Model.

* * * * *